United States Patent
Wang

(10) Patent No.: US 11,048,522 B2
(45) Date of Patent: Jun. 29, 2021

(54) METHOD FOR CONTROLLING SETUP CONFIGURATION AND RELATED COMPUTER SYSTEM

(71) Applicant: Wistron Corporation, New Taipei (TW)

(72) Inventor: Shing-Hang Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 151 days.

(21) Appl. No.: 16/409,851

(22) Filed: May 12, 2019

(65) Prior Publication Data

US 2020/0264898 A1    Aug. 20, 2020

(30) Foreign Application Priority Data

Feb. 18, 2019 (TW) .................................. 10810522

(51) Int. Cl.
*G06F 9/4401* (2018.01)
*G06F 13/20* (2006.01)

(52) U.S. Cl.
CPC ............ *G06F 9/4416* (2013.01); *G06F 13/20* (2013.01)

(58) Field of Classification Search
CPC ................................ G06F 9/4416; G06F 13/20
See application file for complete search history.

(56) References Cited

U.S. PATENT DOCUMENTS

| | | | |
|---|---|---|---|
| 6,490,677 B1 * | 12/2002 | Aguilar ................. | G06F 9/4416 710/8 |
| 6,532,538 B1 * | 3/2003 | Cronk .................... | G06F 9/441 709/222 |
| 9,055,123 B2 * | 6/2015 | Eylon .................... | H04L 67/34 |
| 9,311,104 B1 * | 4/2016 | Feeser .................. | G06F 8/63 |
| 10,372,463 B1 * | 8/2019 | Twomey ............... | G06F 9/4416 |
| 2003/0097587 A1 * | 5/2003 | Gulick .................. | G06F 21/575 726/34 |
| 2006/0271672 A1 * | 11/2006 | Liu ........................ | G06F 9/4416 709/224 |
| 2007/0118658 A1 * | 5/2007 | Broyles ................ | H04L 41/06 709/227 |
| 2007/0157017 A1 * | 7/2007 | Barron, Jr. ........... | G06F 9/4416 713/2 |
| 2009/0083733 A1 * | 3/2009 | Chen .................... | G06F 9/4408 717/178 |
| 2010/0223454 A1 | 9/2010 | Bolay | |
| 2014/0289570 A1 * | 9/2014 | Lewis ................... | G06F 11/3089 714/43 |

(Continued)

OTHER PUBLICATIONS

Alert Standard Format Specification, Version 2.0; Distributed Management Task Force, Inc. (DMTF); Apr. 23, 2003. (Year: 2003).*

(Continued)

*Primary Examiner* — Glenn A. Auve
(74) *Attorney, Agent, or Firm* — Winston Hsu

(57) ABSTRACT

A method for controlling setup configuration is disclosed. The method for controlling setup configuration includes determining an alert standard format (ASF) corresponding to a plurality of setup configurations; and transmitting the ASF corresponding to the plurality of setup configurations to a client terminal, for enabling the client terminal to load the plurality of setup configurations of the ASF when rebooting.

10 Claims, 2 Drawing Sheets

(56) References Cited

U.S. PATENT DOCUMENTS

2015/0154033 A1* 6/2015 Qu ........................ G06F 9/4416
                                                         713/2
2018/0276003 A1* 9/2018 Roszak ............... G06F 11/1417
2020/0184078 A1* 6/2020 Hinrichs ............... H04L 9/3268

OTHER PUBLICATIONS

SBS Implementers Forum, System Management Bus (SMBus) Specification, Version 2.0, Aug. 3, 2000, pp. 1-59.
Hewlett-Packard Development Company, L.P., HP white paper, reducing system management costs with ASF, May 2003, P/N 5981-8001EN, pp. 1-8, May 2003.
G.B.T. Technology Trading GMbH, GA-B75M-D3P, User's Manual, Rev. 1001, 12MC-B75MD3P-1001R, Germany, 2012, pp. 1-45 & 48.
[Teaching] ASUS motherboard BIOS UEFI boot to traditional boot Legacy, https://www.mobile01.com/topicdetail.php?f=5148a=5226646 ,Aug. 2, 2017.

* cited by examiner

METHOD FOR CONTROLLING SETUP CONFIGURATION AND RELATED COMPUTER SYSTEM

BACKGROUND OF THE INVENTION

1. Field of the Invention

The present invention relates to a method for controlling setup configuration and a related computer system, and more particularly, to a method for remotely controlling setup configuration and a related computer system.

2. Description of the Prior Art

Alert Standard Format (ASF) is a standard specification made by a Distributed Management Task Force (DMTF), which enables a computer with ASF to be remotely monitored, managed and controlled, such that the computer can be controlled remotely when the computer is without an operating system. Some specific functions including (but not limited to) false alarm, temperature monitoring, system state monitoring, and on/off may be achieved only when ASF is supported by a LAN-on-motherboard (LOM) or a network interface controller (NIC) with a basic input/output system (BIOS) activation.

A conventional ASF is designed for controlling a boot device of the BIOS. After rebooting the computer, anyone of the boot devices (e.g. hard disk drive (HDD), diagnostic, optical disc drive (ODD) or preboot execution environment (PXE)) is chosen to boot the computer, or a boot option such as a lock sleep button or lock keyboard is set when rebooting. These BIOS settings mentioned above are limited to the boot device or the boot options after booting. When the computer system is originally under a mode of Unified Extensible Firmware Interface (UEFI) booted by the UEFI local area network (LAN), i.e. Boot to UEFI LAN BOOT, and is then going to be rebooted with the PXE under a Legacy mode, the LAN cannot be set to the Legacy mode or the UEFI mode since the boot device of the ASF is restricted to the LAN. Therefore, an improvement to the conventional technique is necessary.

SUMMARY OF THE INVENTION

The present invention provides a method for controlling setup configuration and a related computer system, which can remotely manage a computer of the client terminal and improve the disadvantages of the prior art mentioned above.

An embodiment of the present invention discloses a method for controlling setup configuration, comprising: determining an alert standard format (ASF) corresponding to a plurality of setup configurations; and transmitting the ASF corresponding to the plurality of setup configurations to a client terminal, for enabling the client terminal to load the plurality of setup configurations of the ASF when rebooting.

Another embodiment of the present invention discloses a computer system, comprising: a client terminal; and an administrative terminal, configured to determine an alert standard format (ASF) corresponding to a plurality of setup configurations, and to transmit the ASF corresponding to the plurality of setup configurations to the client terminal through an Internet, for enabling the client terminal to load the plurality of setup configurations of the ASF when rebooting.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
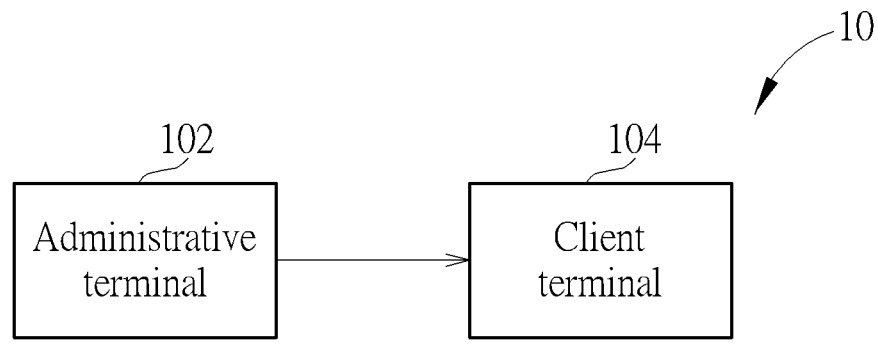
FIG. 1 is a schematic diagram of a computer system according to an embodiment of the present invention.

Refer to FIG. 1, which is a schematic diagram of a computer system 10 according to an embodiment of the present invention. The computer system 10 includes an administrative terminal 102 and a client terminal 104. The administrative terminal 102 and a client terminal 104 may respectively be a computer, a computing device, a server or a device with computing ability. The administrative terminal 102 determines an alert standard format (ASF) including a plurality of setup configurations, and transmits the ASF including the setup configurations to the client terminal 104 through an Internet connection, for enabling the client terminal 104 to load the setup configurations of the ASF when rebooting. In an embodiment, after the administrative terminal 102 determines the setup configurations of the ASF and transmits the ASF to the client terminal 104 through the Internet, the client terminal 104 can read the setup configurations of the ASF when rebooting through a system management bus (SMBus). Therefore, when the administrative terminal 102 is going to control the client terminal 104 to reboot with different setup configurations, the client terminal 104 loads different setup configurations according to the received ASF from the administrative terminal 102, so as to meet requirements selected by the administrative terminal 102.

In detail, a bit mask for boot options of the ASF includes a plurality of reserved bits, wherein the reserved bits may be utilized for storing different setup configurations. In an embodiment, bits 0 to 2 (i.e. [2:0]) of a data byte 9 of the bit mask for boot options of the ASF are unused. The computer system 10 may utilize the unused three bits to store seven different sets of the setup configurations of the ASF (excluding the unset 000b, $2^3-1=7$ sets may be utilized). In addition, the client terminal 104 may predetermine different setup files corresponding to the setup configurations in a build time or in a run time, where each of the setup configurations corresponds to an identification (ID). Since the administrative terminal 102 may know each of the setup configurations set by the client terminal 104, the administrative terminal 102 may determine the setup configuration ID corresponding to the setup configuration, and transmit the setup configuration ID corresponding to the ASF to the client terminal 104 through the Internet. In this way, after the client terminal 104 receives the setup configuration ID corresponding to the ASF, the client terminal 104 loads different setup configurations corresponding to the setup configuration ID. For example, the data byte 9 of the bit mask for boot options of the ASF may include seven sets of setup files of different setup configuration IDs, wherein the following are formats of setup configuration ID #1, setup configuration ID #2 and the setup configuration ID #3:

Setup Configuration ID #1 (for UEFI boot mode)
Setup Configuration ID #2 (for Legacy boot mode)
Setup Configuration ID #3 (for disabling specific USB port)

Therefore, after the client terminal 104 defines the setup files corresponding to different setup configurations in the build time or the run time of the computer system, the administrative terminal 102 may accordingly determine the ASF corresponding to different setup configuration IDs, and transmit the ASF corresponding to different setup configuration IDs to the client terminal 104 through the Internet. Consequently, the corresponding setup configuration of the ASF may be loaded and read when the computer of the client terminal 104 is rebooted.

Figure 2:
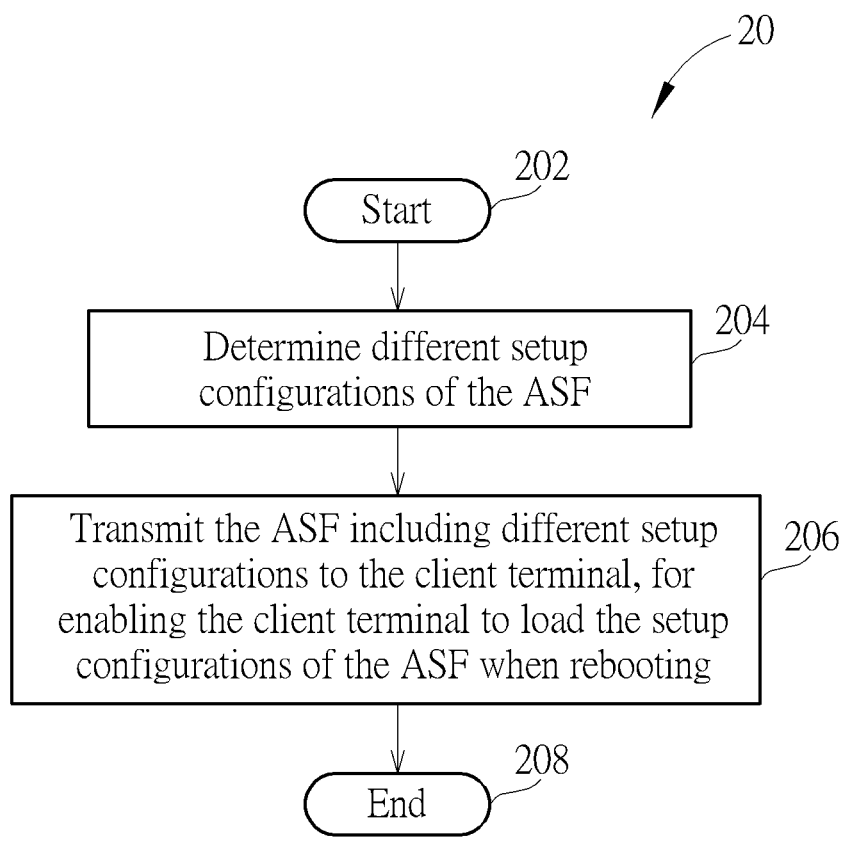
FIG. 2 is a schematic diagram of a controlling process for a setup configuration of an administrative terminal according to an embodiment of the present invention.

An operation method of the administrative terminal 102 may be summarized as a controlling process 20 for the setup configuration, as shown in FIG. 2. The controlling process for the setup configuration includes the following steps:

Step 202: Start.

Step 204: Determine different setup configurations of the ASF.

Step 206: Transmit the ASF including different setup configurations to the client terminal 104, for enabling the client terminal 104 to load the setup configurations of the ASF when rebooting.

Step 208: End.

Refer to the embodiments of the computer system 10 mentioned above for the operation process of the controlling process 20, which is not narrated herein for brevity.

Figure 3:
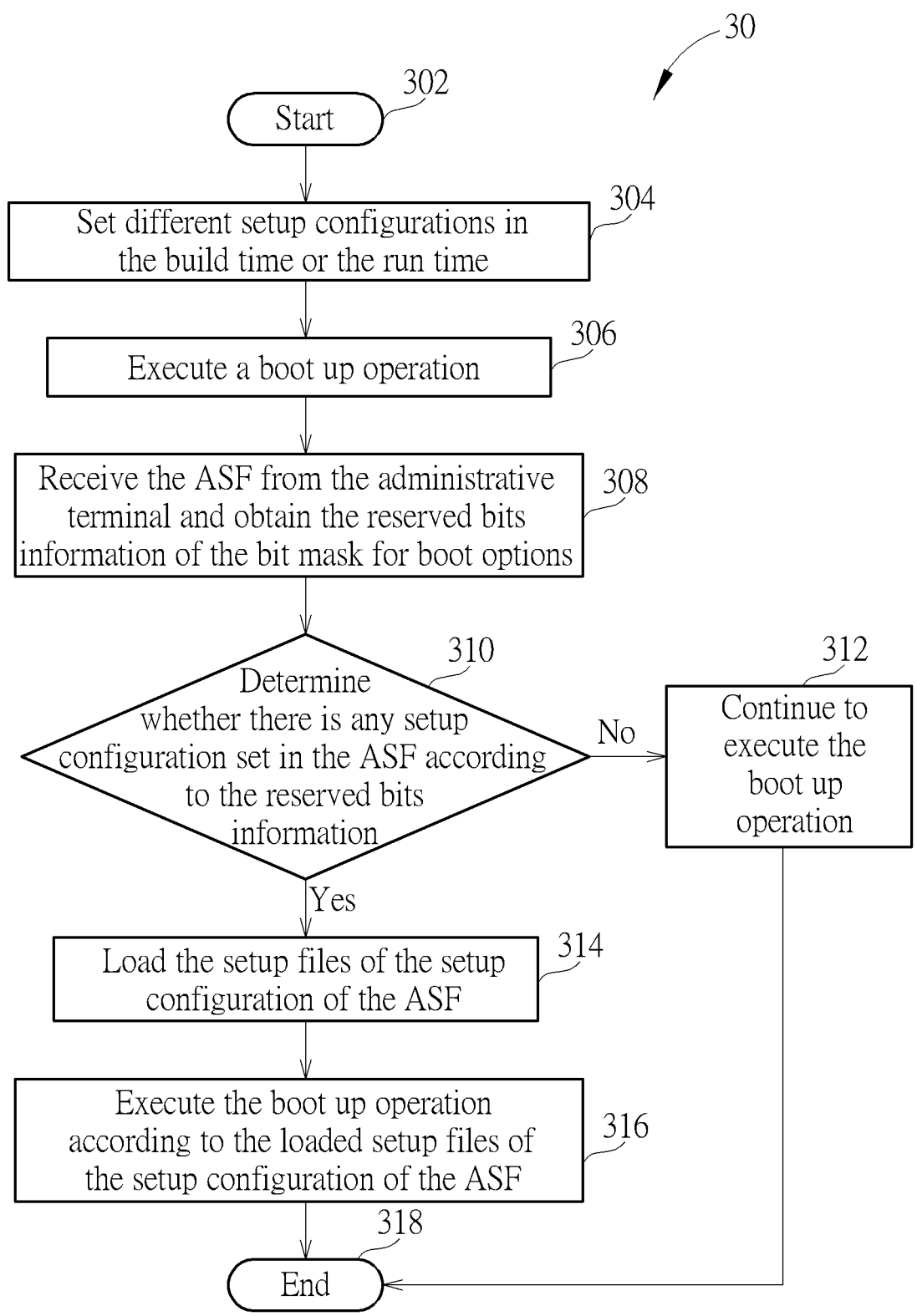
FIG. 3 is a schematic diagram of a setting process for a setup configuration of a client terminal according to an embodiment of the present invention.

An operation method of the client terminal 104 may be summarized as a setting process 30 for the setup configuration, as shown in FIG. 3. The setting process 30 for the setup configuration includes the following steps:

Step 302: Start.

Step 304: Set different setup configurations in the build time or the run time.

Step 306: Execute a boot up operation.

Step 308: Receive the ASF from the administrative terminal 102 and obtain the reserved bits information of the bit mask for boot options.

Step 310: Determine whether there is any setup configuration set in the ASF according to the reserved bits information; if yes, execute step 314, if no, execute step 312.

Step 312: Continue to execute the boot up operation.

Step 314: Load the setup files of the setup configuration of the ASF.

Step 316: Execute the boot up operation according to the loaded setup files of the setup configuration of the ASF.

Step 318: End.

Based on the setting process 30 for the setup configuration, the client terminal 104 may load different setup files corresponding to the setup configuration according to the received ASF from the administrative terminal 102. In step 304, the client terminal 104 sets different setup configurations in the build time or the run time, and executes the boot up operation in step 306. In step 308, the client terminal 104 obtains the ASF transmitted from the administrative terminal 102, wherein the reserved bits information of the bit mask for boot options in the ASF corresponds to different setup configuration IDs. Then, in step 310, the client terminal 104 determines whether there is any setup configuration set in the ASF according to the reserved bits information (i.e. corresponding to different setup configuration IDs). If yes, in step 314, the client terminal 104 loads the setup files of the setup configuration of the ASF set by the administrative terminal 102, and in step 316, the client terminal 104 executes the boot up operation according to the loaded setup files corresponding to the setup configuration ID. In contrast, if there is no setup configuration set in the ASF, the client terminal 104 executes step 312 and continues to execute an original boot up operation.

In an embodiment, the administrative terminal 102 is going to reboot the client terminal 104 with a second setup configuration, wherein the client terminal 104 is originally booted with a first setup configuration. The client terminal 104 loads the setup file of the second setup configuration when rebooting according to the second setup configuration in the ASF, such that the client terminal 104 originally booted by the first setup configuration is booted with the second setup configuration. Notably, the first setup configuration and the second setup configuration are booted with different devices. More specifically, compared to the prior art, the computer system 10 of the present invention may load the setup files corresponding to the setup configuration in the ASF to perform the boot up operation when the client terminal 104 is going to be rebooted under a preboot execution environment (PXE), i.e. Boot to Legacy PXE, the client terminal 104 being originally under the UEFI mode and booted with LAN, i.e. Boot to UEFI LAN boot. Therefore, the computer system of the present invention may perform the boot up operation with different requirements of boot devices or boot options according to different setup files of the setup configuration set by client terminal.

Those skilled in the art may design the computer system based on different system requirements. For example, the setup configurations in the ASF may be varied according to different requirements, i.e. different boot modes, different boot devices or boot options may be utilized for performing the boot up operation, wherein these modifications can be made according to requirements of a user or the computer system. These modifications are not limited thereto, and also belong to the scope of the present invention.

In summary, the present invention provides a method for controlling setup configuration and a related computer system, for managing the setup configuration of the computer of a client terminal to perform a boot up operation with different boot modes, with different boot devices or boot options.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling setup configuration, comprising:
    determining an alert standard format (ASF) supported by an administrative terminal including a plurality of setup configurations; and
    transmitting the ASF including the plurality of setup configurations to a client terminal, for enabling the client terminal to load the plurality of setup configurations of the ASF supported by the administrative terminal when rebooting.

2. The method for controlling setup configuration of claim 1, wherein an amount of the plurality of setup configurations of the ASF is related to a plurality of reserved bits of a bit mask for boot options of the ASF.

3. The method for controlling setup configuration of claim 2, wherein the plurality of reserved bits of the bit mask for boot options are read by a system management bus (SMBus) to load the corresponding plurality of setup configurations when the client terminal reboots.

4. The method for controlling setup configuration of claim 1, wherein the plurality of setup configurations are predetermined in a build time or a run time by the client terminal.

5. The method for controlling setup configuration of claim 1, further comprising:
rebooting the client terminal with a second setup configuration of the plurality of setup configurations according to the loaded plurality of setup configurations of the ASF, instead of rebooting the client terminal with a first setup configuration of the plurality of setup configurations;
wherein the first setup configuration and the second setup configuration are booted with different devices.

6. A computer system, comprising:
a client terminal; and
an administrative terminal, configured to determine an alert standard format (ASF) supported by an administrative terminal including a plurality of setup configurations, and to transmit the ASF including the plurality of setup configurations to the client terminal through an Internet, for enabling the client terminal to load the plurality of setup configurations of the ASF supported by the administrative terminal when rebooting.

7. The computer system of claim 6, wherein an amount of the plurality of setup configurations of the ASF is related to a plurality of reserved bits of a bit mask for boot options of the ASF.

8. The computer system of claim 7, wherein the plurality of reserved bits of the bit mask for boot options are read by a system management bus (SMBus) to load the corresponding plurality of setup configurations when the client terminal reboots.

9. The computer system of claim 6, wherein the plurality of setup configurations are predetermined in a build time or a run time by the client terminal.

10. The computer system of claim 6, wherein the client terminal reboots with a second setup configuration of the plurality of setup configurations according to the loaded plurality of setup configurations of the ASF, instead of rebooting the client terminal with a first setup configuration of the plurality of setup configurations, and the first setup configuration and the second setup configuration are booted with different devices.

* * * * *